United States Patent
Hong et al.

(10) Patent No.: US 8,749,548 B2
(45) Date of Patent: Jun. 10, 2014

(54) DISPLAY SYSTEM WITH IMAGE CONVERSION MECHANISM AND METHOD OF OPERATION THEREOF

(75) Inventors: Hunsop Hong, Irvine, CA (US); Yeong-Taeg Kim, Irvine, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 214 days.

(21) Appl. No.: 13/224,271

(22) Filed: Sep. 1, 2011

(65) Prior Publication Data

US 2013/0057537 A1  Mar. 7, 2013

(51) Int. Cl.
*G06T 15/00* (2011.01)
*G06K 9/00* (2006.01)

(52) U.S. Cl.
USPC ............... 345/419; 382/154; 348/43; 348/46

(58) Field of Classification Search
CPC ......... G06T 15/00; G06T 17/00; G06T 17/20; G06K 9/00; H04N 13/00; H04N 13/02
USPC .......... 345/419, 43; 382/103, 154; 348/43, 46
See application file for complete search history.

(56) References Cited

U.S. PATENT DOCUMENTS

| | | | |
|---|---|---|---|
| 7,324,687 B2 * | 1/2008 | Zitnick et al. | 382/154 |
| 8,330,801 B2 * | 12/2012 | Wang et al. | 348/46 |
| 2006/0165315 A1 * | 7/2006 | Ernst et al. | 382/302 |
| 2008/0303894 A1 * | 12/2008 | Ernst et al. | 348/43 |

FOREIGN PATENT DOCUMENTS

| | | |
|---|---|---|
| JP | 10091786 | 10/1998 |
| KR | 20090080556 A | 7/2009 |
| KR | 20100034789 A | 4/2010 |

* cited by examiner

*Primary Examiner* — Kimbinh T Nguyen
(74) *Attorney, Agent, or Firm* — IP Investment Law Group (57) ABSTRACT

A method of operation of a display system includes: calculating a focus measure for an original image; calculating a segment mean based on the focus measure for a segment; generating an ordered segment based on the segment mean; generating a segment depth based on the ordered segment; and generating a three-dimensional image with the segment depth for displaying on a device.

20 Claims, 5 Drawing Sheets

DISPLAY SYSTEM WITH IMAGE CONVERSION MECHANISM AND METHOD OF OPERATION THEREOF

TECHNICAL FIELD

The present invention relates generally to a display system and more particularly to a system for image conversion.

BACKGROUND ART

Modern consumer and industrial electronics, especially devices such as graphical display systems, televisions, projectors, cellular phones, portable digital assistants, and combination devices, are providing increasing levels of functionality to support modern life including three-dimensional display services. Research and development in the existing technologies can take a myriad of different directions.

As users become more empowered with the growth of three-dimensional display devices, new and old paradigms begin to take advantage of this new device space. There are many technological solutions to take advantage of this new display device opportunity. One existing approach is to display three-dimensional images on consumer, industrial, and mobile electronics such as video projectors, televisions, monitors, gaming systems, or a personal digital assistant (PDA).

Three-dimensional display based services allow users to create, transfer, store, and/or consume information in order for users to create, transfer, store, and consume in the "real world". One such use of three-dimensional display based services is to efficiently present three-dimensional images on a display.

Three-dimensional display systems have been incorporated in projectors, televisions, notebooks, handheld devices, and other portable products. Today, these systems aid users by displaying available relevant information, such as diagrams, maps, or videos. The display of three-dimensional images provides invaluable relevant information.

However, displaying information in three-dimensional form has become a paramount concern for the consumer. Displaying a three-dimensional image that does not correlate with the real world decreases the benefit of using the three-dimensional display systems.

Thus, a need still remains for a three-dimensional display system with image conversion mechanism to display three-dimensional images. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a display system, including: calculating a focus measure for an original image; calculating a segment mean based on the focus measure for a segment; generating an ordered segment based on the segment mean; generating a segment depth based on the ordered segment; and generating a three-dimensional image with the segment depth for displaying on a device.

The present invention provides a display system, including: a focus calculation module for calculating a focus measure for an original image; a mean calculation module, coupled to the focus calculation module, for calculating a segment mean based on the focus measure for a segment; a segment order module, coupled to the mean calculation module, for generating an ordered segment based on the segment mean; a depth assignment module, coupled to the segment order module, for generating a segment depth based on the ordered segment; and a three-dimensional generation module, coupled to the depth assignment module, for generating a three-dimensional image with the segment depth for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation.

The term "module" referred to herein include software, hardware, or a combination thereof. For example, the software can be machine code, firmware, embedded code, and application software. Also for example, the hardware can be circuitry, processor, computer, integrated circuit, integrated circuit cores, a camera, a camcorder, a microelectromechanical system (MEMS), passive devices, or a combination thereof.

Some approaches utilize segmentation for depth assignment with relative motion of segments for successive images by image matching. Thus, it can be considered as a depth-assigning algorithm, which combines segmentation and motion.

Another approach introduces depth assignment based on disparity space distribution (DSD) function. The DSD function is used for a stochastic description of disparity of certain segments. Based on an estimated DSD, each segment has same depth value corresponding to a maximum probability value of DSD. However, the DSD function considers some relationship with neighbors but does not deal with focus information such as edge and frequency. Embodiments of the present invention provide solutions or answers to effectively improve generation of three-dimensional images without motion estimation and DSD.

Figure 1:
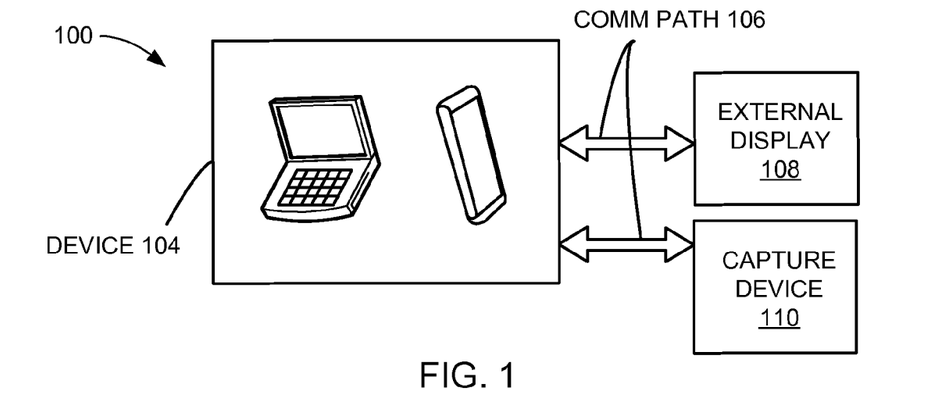
FIG. 1 is a display system with image conversion mechanism in an embodiment of the present invention.

Referring now to FIG. 1, therein is shown a display system 100 with image conversion mechanism in an embodiment of the present invention. The display system 100 can include a device 104. The device 104 is defined as an electronic machine capable of storing and computing digital data. For example, the device 104 can be of any of a variety of mobile devices, such as a cellular phone, a personal digital assistant, a tablet, a notebook computer, a tablet PC, a tabletop computer, a smart surface, or other multi-functional mobile communication or entertainment device.

In another example, the device 104 can be an electronic machine, such as a camera, a mainframe, a server, a cluster server, rack mounted server, or a blade server, or as more specific examples, an IBM System z10™ Business Class mainframe or a HP ProLiant ML™ server. Yet another example, the device 104 can be a specialized machine, such as a streaming entertainment device, a portable computing device, a digital camera, a thin client, a notebook, a netbook, a smartphone, personal digital assistant, or a cellular phone, and as specific examples, a Samsung Galaxy Tab™, a Samsung 55" Class LED 8000 Series Smart TV, a Samsung 3D Blu-ray Disc™ Player, an Apple iPad™, an Apple iPhone™, a Palm® Centro™, or a MOTO Q™ global.

The device 104 can be a standalone device, or can be incorporated with a larger electronic system, for example a home theatre system, a personal computer, or a vehicle. The device 104 can be coupled to a communication path 106 to communicate with external devices, such as an external display 108 and a capture device 110.

The communication path 106 is defined as an interconnection between electronic terminals. The communication path 106 can be a variety of networks. For example, the communication path 106 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 106. Ethernet, digital subscriber line (DSL), fiber to the home (FTTH), and plain old telephone service (POTS) are examples of wired communication that can be included in the communication path 106.

Further, the communication path 106 can traverse a number of network topologies and distances. For example, the communication path 106 can include direct connection, personal area network (PAN), local area network (LAN), metropolitan area network (MAN), wide area network (WAN) or any combination thereof.

The external display 108 is defined as a device for displaying stored images of the display system 100. The external display 108 be, for example, a 3D TV, a pair of goggles, an LCD screen, or a touch screen. The external display 108 can have observable depths of images and motion images, and capable of displaying three-dimensionally. The capture device 110 is defined as a device for recording images for the display system 100. The capture device 110 can be, for example, a digital camera, a camcorder, a webcam, or an array of sensors.

For illustrative purposes, the display system 100 is described with the device 104 as a mobile computing device, although it is understood that the device 104 can be different types of computing devices. For example, the device 104 can also be a non-mobile computing device, such as a server, a server farm, or a desktop computer.

Figure 2:
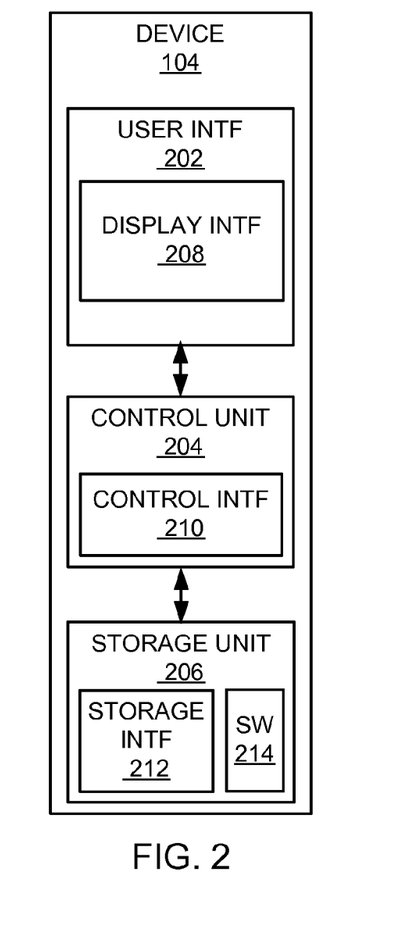
FIG. 2 is an exemplary block diagram of the device.

Referring now to FIG. 2, therein is shown an exemplary block diagram of the device 104. The device 104 can include a user interface 202, a control unit 204, and a storage unit 206. The user interface 202 can include a display interface 208. The control unit 204 can include a control interface 210. The storage unit 206 can include a storage interface 212.

The user interface 202 allows a user to interface and interact with the device 104. The user interface 202 can include an input device and an output device. Examples of the input device of the user interface 202 can include a keypad, a touchpad, soft-keys, a keyboard, a microphone, a touch pad, a camera, a webcam, or a combination thereof to provide data and communication inputs.

The user interface 202 can include the display interface 208. Examples of the output device of the user interface 202 can include the display interface 208. The display interface 208 can include a display, a projector, a video screen, a speaker, or a combination thereof. The display interface 208 can also be a touch screen, such that inputs can be received from the display interface 208.

The control unit 204 can execute a software 214 to provide the intelligence of the device 104. The control unit 204 can operate the user interface 202 to display information generated by the device 104. The control unit 204 can also execute the software 214 for the other functions of the device 104, including receiving image information from the capture device 110 of FIG. 1. The control unit 204 can further execute the software 214 for adjusting and updating the image information to display on or through the display interface 208.

The control unit 204 can be implemented in a number of different manners. For example, the control unit 204 can be a processor, an embedded processor, a microprocessor, a hardware control logic, a hardware finite state machine, a digital signal processor, or a combination thereof.

The control unit 204 can include the control interface 210. The control interface 210 can be used for communication between the control unit 204 and other modules in the device 104. The control interface 210 can also be used for communication that is external to the device 104.

The control interface 210 can receive information from the other modules or from external sources, or can transmit information to the other modules or to external destinations. The external sources and the external destinations refer to sources and destinations external to the device 104.

The control interface 210 can be implemented in different ways and can include different implementations, depending on which modules or external units are interfacing with the control interface 210. For example, the control interface 210 can be implemented with a pressure sensor, an inertial sensor, a microelectromechanical system, optical circuitry, waveguides, wireless circuitry, wireline circuitry, or a combination thereof.

The storage unit 206 can store the software 214. The storage unit 206 can also store the relevant information, such as advertisements, preferred settings, operating system, previous adjustments and updates, or a combination thereof.

The storage unit 206 can be a volatile memory, a nonvolatile memory, an internal memory, an external memory, or a combination thereof. For example, the storage unit 206 can be a nonvolatile storage such as non-volatile random access memory, Flash memory, disk storage, or a volatile storage such as static random access memory.

The storage unit 206 can include the storage interface 212. The storage interface 212 can be used for communication between the control unit 204 and other modules in the device 104. The storage interface 212 can also be used for communication that is external to the device 104.

The storage interface 212 can receive information from the other modules or from external sources, or can transmit information to the other modules or to external destinations. The external sources and the external destinations referred to as sources and destinations external to the device 104.

The storage interface 212 can be implemented differently depending on which modules or external units are being interfaced with the storage unit 206. The storage interface 212 can be implemented with technologies and techniques similar to the implementation of the control interface 210.

Figure 3:
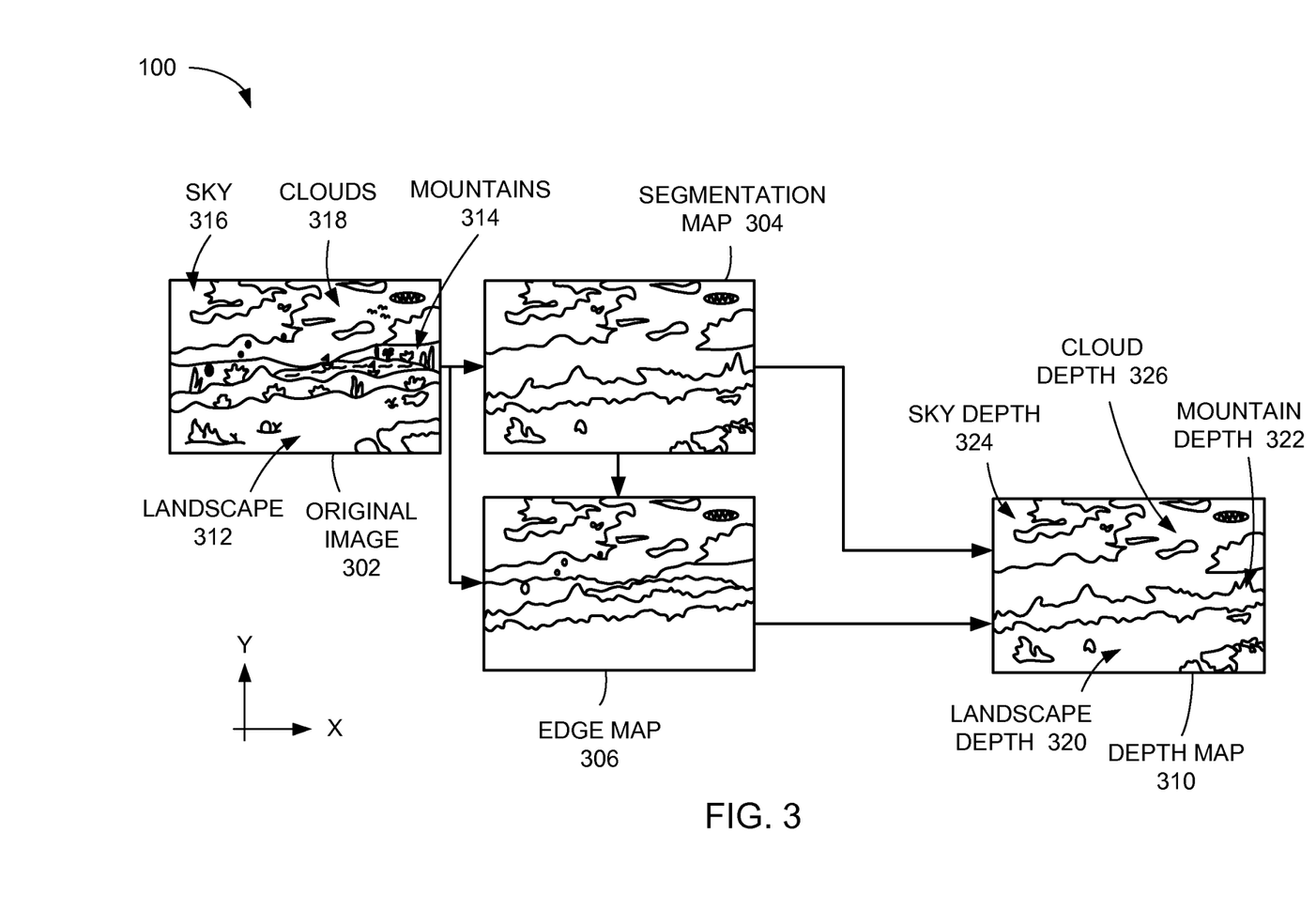
FIG. 3 is an example of an operation of the display system.

Referring now to FIG. 3, therein is shown an example of an operation of the display system 100. The display system 100 can process an original image 302 to generate a segmentation map 304 and an edge map 306. The original image 302 depicts a landscape 312 and mountains 314 with a sky 316 over the landscape 312 and clouds 318 in the sky 316. Generation of the segmentation map 304 and the edge map 306 will be further described in a subsequent section.

The segmentation map 304 is defined as a representation of the original image 302 that has been partitioned into multiple portions or sets of pixels. The edge map 306 is defined as a representation of the original image 302 that identifies points in the original image 302 at which image brightness changes sharply or has discontinuities.

The display system 100 can generate a depth map 310, which is defined as a representation of the original image 302 with depths assigned to the portions of the original image 302. The depths are defined as distances from a planar surface providing a three-dimensional image. Generation of the depth map 310 will be further described in a subsequent section.

The original image 302 can include multiple features, which are defined as objects that are shown in the original image 302. For example, the features can include human faces, printed characters, vehicles, landscapes, or any other objects that are captured when the original image 302 was generated. For a specific example, the features in the original image 302 are shown to include the landscape 312, the mountains 314, the sky 316, and the clouds 318.

For example, the depths in the depth map 310 are shown to include a landscape depth 320, a mountain depth 322, a sky depth 324, and a cloud depth 326, which correspond to the landscape 312, the mountains 314, the sky 316, and the clouds 318, respectively. Also for example, order of the depths can be in an increasing order of the sky depth 324, the cloud depth 326, the mountain depth 322, and the landscape depth 320 with the landscape depth 320 having the largest value indicating that the landscape 312 is closest to a viewer and the sky depth 324 having the smallest value indicating that the sky 316 is farthest from the viewer.

As an example, FIG. 3 depicts an x-axis and a y-axis that are lines in a plane of the original image 302, the segmentation map 304, the edge map 306, and the depth map 310. The x-axis and the y-axis represent a horizontal line and a vertical line, respectively, along a longer side and a shorter side, respectively, of the original image 302, the segmentation map 304, the edge map 306, and the depth map 310.

Figure 4:
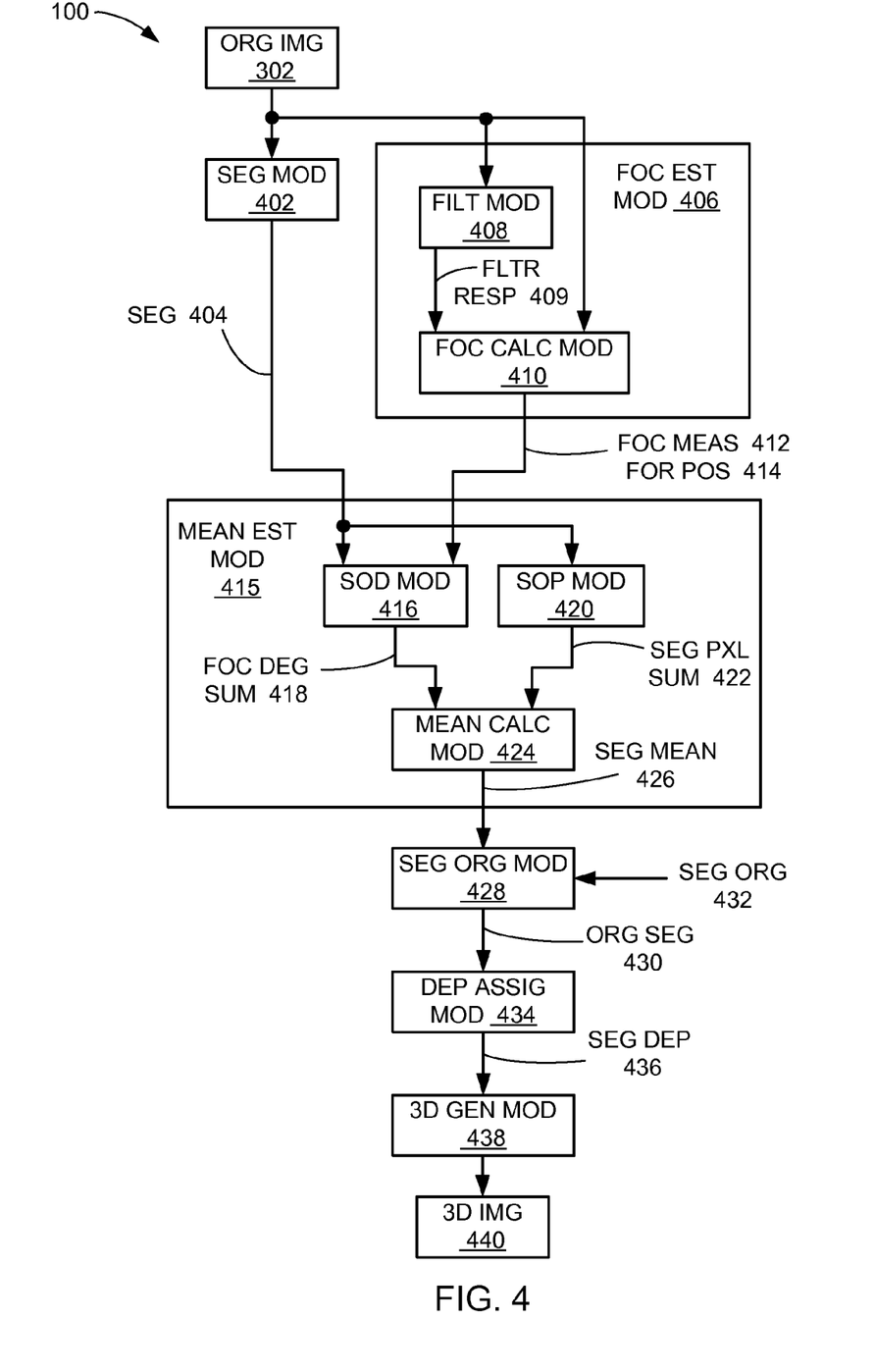
FIG. 4 is a control flow of the display system.

Referring now to FIG. 4, therein is shown a control flow of the display system 100. The display system 100 can include a segmentation module 402, which is defined as a module that partitions the original image 302 into multiple segments 404. The segments 404 are defined as groups of pixels of the original image 302. The segments 404 can be generated from the original image 302.

For example, let each of the segments 404 be denoted as R. The original image 302 can be partitioned by dividing or segmenting the original image 302 into N number of the segments 404, denoted as $R_1 \ldots R_N$. The segmentation module 402 can generate the segmentation map 304 of FIG. 3 with a number of the segments 404.

The segmentation module 402 can generate the segments 404 in a number of ways. For example, the segmentation module 402 can include histogram-based methods. For a specific example, the segments 404 can be generated using a histogram computed from all of pixels in the original image 302 with peaks and valleys in the histogram used to locate clusters of the pixels in the original image 302. Color or intensity can be used for measurement and identification of the peaks and the valleys.

For another example, the segmentation module 402 can include clustering methods. For a specific example, the segments 404 can be generated using a K-means method, which is an iterative technique that is used to partition an image into K clusters, by assigning each pixel in the image to the cluster that minimizes the distance between the pixel and the cluster center and re-computing the cluster centers by averaging all of the pixels in the cluster.

For yet another example, the segmentation module 402 can generate the segments 404 using a dynamic template generation. A dynamic template is a set of segmentations, which are generated by segmentation logic. One of the segmentations in the dynamic template can share similar depths and thus can share same degrees of focus.

The display system 100 can include a focus estimation module 406, which is defined as a module that determines image clarity for pixels or positions on the original image 302. The focus estimation module 406 can include a filter module 408, which is defined as a module that measures magnitudes of frequency changes of the original image 302.

The filter module 408 can generate a filter response 409, which is defined as a frequency response having predetermined frequency components of the original image 302. The predetermined frequency components are defined as frequencies that are above a cutoff frequency, which is defined as a frequency at which output voltage amplitude is −3 dB of input voltage amplitude. For example, the filter response 409 can represent an arbitrary focus measure function of the filter module 408.

A focus measure function can include any methods of measuring a degree of focus. For example, an out-of-focus area can be blurry, and an in-focus area can be sharp. Thus, the degree of focus can be estimated by measuring high frequency components in a target area.

The filter module 408 measures magnitudes of frequency changes of pixel characteristics at or near image pixels. The pixel characteristics are measurable qualities of pixels of the original image 302. For example, the pixel characteristics can include color, intensity, texture, tone, saturation, or a combination thereof. Also for example, the filter module 408 can include a high pass filter to measure magnitudes of high frequency changes of the pixel characteristics.

The filter response 409 can include a representation of the original image 302 with texture information. Texture information refers to high frequency areas or high frequency components of the original image 302 that are passed through the filter module 408. The high frequency areas include details resulting in a sharpened image.

The display system 100 can include a focus calculation module 410, which is defined as a module that determines clarity of an image or portions of the image by calculating focus measures 412 for positions 414 on the original image 302. Clarity is defined as lack of blurriness or a degree of focus of an object in an image. The focus measures 412 are defined as magnitudes determined by assigning each image point to a quantifiable magnitude of clarity. For example, the focus measures 412 are edge strengths, which are degrees of focus, of the original image 302.

The focus measures 412 can include measures of how closely light rays originating from a surface point of an object converge to the image point. The focus calculation module 410 can generate the edge map 306 of FIG. 3 based on the filter response 409 and the focus measures 412.

The positions 414 are defined as specific pixels within an image. For example, the positions 414 can be represented by coordinates along an x-axis and a y-axis, as depicted in FIG. 3, for a two-dimensional (2D) image including the original image 302.

As a specific example, a method of generating the focus measures 412 for the positions 414, one of which is denoted as (x,y), in the original image 302 can be expressed by the following equation.

$$H(x,y) = F(x,y) \bullet I(x,y) \quad (1)$$

where $I(x,y)$ is the original image 302, $F(x,y)$ is the filter response 409 of the filter module 408, $\bullet$ denotes a general operation between functions including convolution, and $H(x,y)$ is a function that describes a degree of focus at the point of (x,y).

The focus measures 412 can be generated with the function $H(x,y)$. For example, the focus measures 412 can be generated by calculating a convolution of the original image 302 and the filter response 409 at each of the positions 414.

The display system 100 can include a mean estimation module 415, which is defined as a module that calculates an average of the focus measures 412 for each of the segments 404 in the segmentation map 304. The display system 100 can process averages of the focus measures 412 of the segments to generate the depth map 310 of FIG. 3. For example, the depth map 310 can include the landscape depth 320 of FIG. 3, the mountain depth 322 of FIG. 3, the sky depth 324 of FIG. 3, and the cloud depth 326 of FIG. 3.

The mean estimation module 415 can include a sum-of-degree module 416, which is defined as a module that determines a sum of degrees of focus at each position in a segment of the two-dimensional image. The sum-of-degree module 416 can generate a focus degree sum 418, which is defined as a sum of degrees of focus at each of the positions 414 in one of the segments 404. The focus degree sum 418 can be expressed by the following equation.

$$\text{focus\_degree\_sum} = \Sigma_{(x,y) \in R_k} H(x,y) \quad (2)$$

where $H(x,y)$ is one of the focus measures 412, $(x,y)$ is one of the positions 414, denotes a member of, $R_k$ is the $k^{th}$ or one of the segments 404, and $\Sigma$ denotes a summation operation.

The focus degree sum 418 of one of the segments 404 can be calculated based on the focus measures 412 and the segments 404. The focus degree sum 418 of one of the segments 404 can be calculated by calculating a summation of the focus measures 412 at the positions 414 in the one of the segments 404.

The mean estimation module 415 can include a sum-of-pixel module 420, which is defined as a module that determines a sum of pixels in a segment of the two-dimensional image. The sum-of-pixel module 420 can generate a segment pixel sum 422, which is defined as a sum of a number of pixels in one of the segments 404. The segment pixel sum 422 can be expressed by the following equation.

$$\text{segment\_pixel\_sum} = \Sigma_{(x,y) \in R_k} \quad (3)$$

where $(x,y)$ is one of the positions 414, denotes a member of, $R_k$ is the $k^{th}$ or one of the segments 404, and $\Sigma$ denotes a summation operation.

The segment pixel sum 422 can be calculated based on the segments 404. The segment pixel sum 422 can be calculated by calculating a summation of a number of the positions 414 in the one of the segments 404.

The mean estimation module 415 can include a mean calculation module 424, which is defined as a module that determines an average of a number of the focus degree sum 418 of all of the positions 414 in each of the segments 404. The mean calculation module 424 can generate a segment mean 426, which is defined as an average of a number of the focus degree sum 418 of all of the positions 414 in each of the segments 404. The segment mean 426 can be expressed by the following equation.

$$S_k = \frac{1}{\text{segment\_pixel\_sum}} \times \text{focus\_degree\_sum} \quad (4)$$

where $S_k$ is the segment mean 426 in the $k^{th}$ region, which is one of the segments 404. The segment mean 426 can be calculated by dividing the focus degree sum 418 by the segment pixel sum 422. The segment mean 426 can be calculated by substituting the focus degree sum 418 and the segment pixel sum 422 in equation 4 with equations 2 and 3, respectively, as expressed by the following equation.

$$S_k = \frac{1}{\sum_{(x,y) \in R_k}} \sum_{(x,y) \in R_k} H(x,y) \quad (5)$$

where $H(x,y)$ is one of the focus measures 412, $(x,y)$ is one of the positions 414, denotes a member of, $R_k$ is the $k^{th}$ or one of the segments 404, and $\Sigma$ denotes a summation of.

The segment mean 426 can represent a mean of a high frequency component or a focus measure component for each segmented area. For example, the segment mean 426 can represent a mean of focus measure in the $k^{th}$ region, denoted as $S_k$.

The display system 100 can include a segment order module 428, which is defined as a module that determines an order of means of focus measure values of segmented areas. The segment order module 428 can generate ordered segments 430, which are defined as an arrangement or an order of means of focus measure values of segmented areas. The ordered segments 430 can be generated by arranging all of the segments 404 in a segment order 432 based on a value of the segment mean 426 of each of the segments 404.

The segment order 432 is defined as an arrangement of segmented areas of the two-dimensional image. The segment order 432 can be predetermined by configuring the segment order 432 to a known or fixed state prior to generating the ordered segments 430. The segment order 432 can be stored in the storage unit 206 of FIG. 2 and read by the segment order module 428.

The segment order 432 can preferably include an increasing order of focus measure values, starting with the lowest focus measure value and ending with the highest focus measure value, although the segment order 432 can include any order. For example, the segment order 432 can include a decreasing order.

The display system 100 can include a depth assignment module 434, which is defined as a module that determines a depth value of each segmented area. The depth assignment module 434 can generate segment depths 436, which are defined as values of depth of segmented areas. The segment depths 436 can be generated based on the ordered segments 430. The depth assignment module 434 can generate the depth map 310 with the segment depths 436.

One of the useful cues for depth estimation from a 2D image can include focus information, such as the focus measures 412. In the 2D image, an in-focus area can include a high depth value, and an out-of-focus area can include a low depth value.

Depth assignment can be implemented by ordering each of segment patches, such as the segments 404, to generate the ordered segments 430 based on mean values of high frequency components of each of the segment patches. The ordered segments 430 can be generated based on the segment mean 426 of a high frequency component of each of the segments 404.

The segment depths 436 can be generated based on the ordered segments 430. Thus, the segment depths 436 can be generated based on the segment order 432 by which the segment mean 426 of each of the segments 404 is arranged. The higher a value of the segment mean 426, the higher a value of one of the segment depths 436. For example, one of the segments 404 having one of the segment depths 436 with the highest value can be closest to the viewer.

Depth assignment method is not constrained to any particular method. Depth assignment method can include any method that assigns a value to each of the segment depths 436 for each of the ordered segments 430. For a specific example, one of the segment depths 436 at pixel (x,y), which is one of the positions 414, can be expressed by the following equation.

$$D(x, y)|_{(x,y) \in R_k} = \frac{A}{S_{max}} S_k \quad (6)$$

where A is an arbitrary or predetermined gain, $S_{max}$ is the maximum value of $S_k$ for k={1, ..., N} with N denotes a total number of the segments 404, $S_k$ is the segment mean 426 of the $k^{th}$ of the segments 404, (x,y) is one of the positions 414, denotes a member of, $R_k$ is the $k^{th}$ or one of the segments 404, and D(x,y) is one of the segment depths 436 at one of the positions 414.

Let $S_{(i)}$ denote the $i^{th}$ smallest focus measure value among {$S_1, S_2, ..., S_N$}, where $S_{(1)} < S_{(2)} < ... < S_{(N)}$. The segment depths 436 can be assigned to each of the ordered segments 430, denoted as $S_{(i)}$. The segment depths 436 can be expressed by the following equation.

$$D_1 < D_2 < ... < D_N \quad (7)$$

where {$D_1, D_2, ..., D_N$} represents a predetermined set of depth values for {$S_1, S_2, ..., S_N$}. The predetermined set of depth values are configured to known or fixed values prior to assigning the segment depths 436 to each of the ordered segments 430, denoted as $S_{(i)}$. Assignment of the segment depths 436 provides a novel way to assign depth to two-dimensional images.

For example, let the features in the original image 302 depicted in FIG. 3 include an order of the sky 316 of FIG. 3, the clouds 318 of FIG. 3, the mountains 314 of FIG. 3, and the landscape 312 of FIG. 3 with the landscape 312 represents an object that is in focus more than other features. The landscape 312 also represents the object that is closest to a viewer than the other features. The depth assignment module 434 can generate the segment depths 436, one of which has the largest value and is assigned to the landscape depth 320 of FIG. 3 and another of which has the smallest value and is assigned to the sky depth 324 of FIG. 3.

The display system 100 can include a three-dimensional generation module 438, which is defined as a module that determines a three-dimensional image 440. The three-dimensional image 440 is defined as an image generated with information from a two-dimensional image and depth values. As described above, the display system 100 can include a method for ordering the segment depths 436 of segmented objects, such as the ordered segments 430, with a scene in the original image 302 having texture information to generate the three-dimensional image 440.

The three-dimensional generation module 438 can generate the three-dimensional image 440 with the original image 302 and the segment depths 436. The three-dimensional image 440 can be processed and stored in the storage unit 206 for displaying on the device 104 of FIG. 1, the external display 108 of FIG. 1, or a combination thereof.

It is understood that the display system 100 can include any ordering method. It is also understood that the display system 100 can include any depth assigning method.

The control flow can optionally include a check for a number of conditions at the beginning of the control flow. For example, the control flow can include a check for the original image 302 having a scene full of texture or full of high frequency areas. Also for example, the control flow can include a check for the original image 302 having a scene with an out-of-focus object closer to a viewer than an in-focus object. When any of the checks mentioned above is detected, the display system 100 can optionally bypass the modules described above and generate the three-dimensional image 440 to the same as the original image 302 without any of the segment depths 436 generated.

It has been discovered that the segment order module 428 generating the ordered segments 430 with the segment order 432 for the depth assignment module 434 to assign the segment depths 436 provides improved 2D-to-3D conversion.

It has also been discovered that distinctive depth information, such as the segment depths 436, can be effectively assigned to the ordered segments 430 by utilizing segmentation information, such as the segments 404 extracted from the original image 302 and generated with the segmentation module 402, thereby eliminating problems caused by focus measurement not distinctive from object to object in cases where it is very crucial to have depth perception.

It has further been discovered that utilizing good measure focus, such as the edge map 306 and the focus measures 412 generated by the focus calculation module 410, provides an effective method of generating and assigning depths, such as the segment depths 436, to generate the three-dimensional image 440 with the original image 302 and the segment depths 436 for 2D-to-3D conversion.

It has yet further been discovered that a major advantage is provided with dynamic template generation using segmentation algorithm to generate the segments 404 with the segmentation module 402 and the focus measures 412 with the focus calculation module 410 without any basic depth model previously given thereby providing effective generation of the segment depths 436 with the segment mean 426 for any arbitrary image, such as the original image 302.

It has yet further been discovered that the focus degree sum 418 generated by the sum-of-degree module 416 and the segment pixel sum 422 generated by the sum-of-pixel module 420 provide generation of the segment mean 426 to effectively calculate the ordered segments 430.

It has yet further been discovered that the filter module 408 allows accurate calculation of the focus measures 412 by the focus calculation module 410.

It has yet further been discovered that generating the depth map 310 with the segment depths 436 based on the ordered segments 430 provides the display system 100 with a smoother depth estimation thereby eliminating three-dimensional visual defects.

The focus calculation module 410 can be coupled to the filter module 408. The focus calculation module 410 and the segmentation module 402 can be coupled to the sum-of-degree module 416.

The sum-of-pixel module 420 can be coupled to the segmentation module 402. The sum-of-pixel module 420 and the sum-of-degree module 416 can be coupled to the mean calculation module 424.

The segment order module 428 can be coupled to the mean calculation module 424 and the depth assignment module 434. The depth assignment module 434 can be coupled to the three-dimensional generation module 438.

The segmentation module 402 can be implemented with the user interface 202 of FIG. 2, the control unit 204 of FIG. 2, the control interface 210 of FIG. 2, the storage unit 206, the storage interface 212 of FIG. 2, and the software 214 of FIG. 2. For example, the user interface 202, the control interface 210, or a combination thereof can be implemented to receive the original image 302. Also for example, the control unit 204, the storage interface 212, the software 214, or a combination thereof can be implemented to generate the segmentation map 304 and the segments 404.

The filter module 408 can be implemented with the user interface 202, the control unit 204, the control interface 210, the storage unit 206, the storage interface 212, and the software 214. For example, the user interface 202, the control interface 210, or a combination thereof can be implemented to receive the original image 302. Also for example, the control unit 204, the storage interface 212, the software 214, or a combination thereof can be implemented to measure magnitudes of frequency changes of the pixel characteristics of the original image 302.

The focus calculation module 410 can be implemented with the user interface 202, the control unit 204, the control interface 210, the storage unit 206, the storage interface 212, and the software 214. For example, the user interface 202, the control interface 210, or a combination thereof can be implemented to receive the original image 302. Also for example, the control unit 204, the storage interface 212, the software 214, or a combination thereof can be implemented to generate the edge map 306 and the focus measures 412.

The sum-of-degree module 416 can be implemented with the control unit 204, the storage unit 206, the storage interface 212, and the software 214. For example, the control unit 204, the storage interface 212, the software 214, or a combination thereof can be implemented to generate the focus degree sum 418.

The sum-of-pixel module 420 can be implemented with the control unit 204, the storage unit 206, the storage interface 212, and the software 214. For example, the control unit 204, the storage interface 212, the software 214, or a combination thereof can be implemented to generate the segment pixel sum 422.

The mean calculation module 424 can be implemented with the control unit 204, the storage unit 206, the storage interface 212, and the software 214. For example, the control unit 204, the storage interface 212, the software 214, or a combination thereof can be implemented to generate the segment mean 426.

The segment order module 428 can be implemented with the user interface 202, the control unit 204, the control interface 210, the storage unit 206, the storage interface 212, and the software 214. For example, the user interface 202, the control interface 210, or a combination thereof can be implemented to preset or pre-configure the segment order 432. Also for example, the control unit 204, the storage interface 212, the software 214, or a combination thereof can be implemented to generate the ordered segments 430.

The depth assignment module 434 can be implemented with the control unit 204, the storage unit 206, the storage interface 212, and the software 214. For example, the control unit 204, the storage interface 212, the software 214, or a combination thereof can be implemented to generate the segment depths 436.

The three-dimensional generation module 438 can be implemented with the user interface 202, the control unit 204, the display interface 208 of FIG. 2, the control interface 210, the storage unit 206, the storage interface 212, and the software 214. For example, the user interface 202, the display interface 208, the control interface 210, or a combination thereof can be implemented to display the three-dimensional image 440. Also for example, the control unit 204, the storage interface 212, the software 214, or a combination thereof can be implemented to generate the three-dimensional image 440.

The physical transformation from displaying the three-dimensional image 440 results in movement in the physical world, such as people moving in response to the three-dimensional image 440 when playing games or viewing the three-dimensional image 440. The display interface 208 can display the three-dimensional image 440 by manipulating pixels at one of the positions 414 on the device 104, thus resulting in movement in the physical world.

The display system 100 describes the module functions or order as an example. The modules can be partitioned differently. For example, the segment order module 428 and the depth assignment module 434 can be implemented together in one module. Each of the modules can operate individually and independently of the other modules. Furthermore, data generated in one module can be used by another module without being directly coupled to each other.

The "modules" described above can be implemented in a number of different fashions but refer to hardware implementation depending on context as used in this application, including the claims which follow later. In apparatus or system claims, the "modules" are hardware implementations as specialized hardware blocks separate from those shown in FIG. 2 and can be part of those shown in FIG. 2, such as the control unit 204 or the display interface 208.

Figure 5:
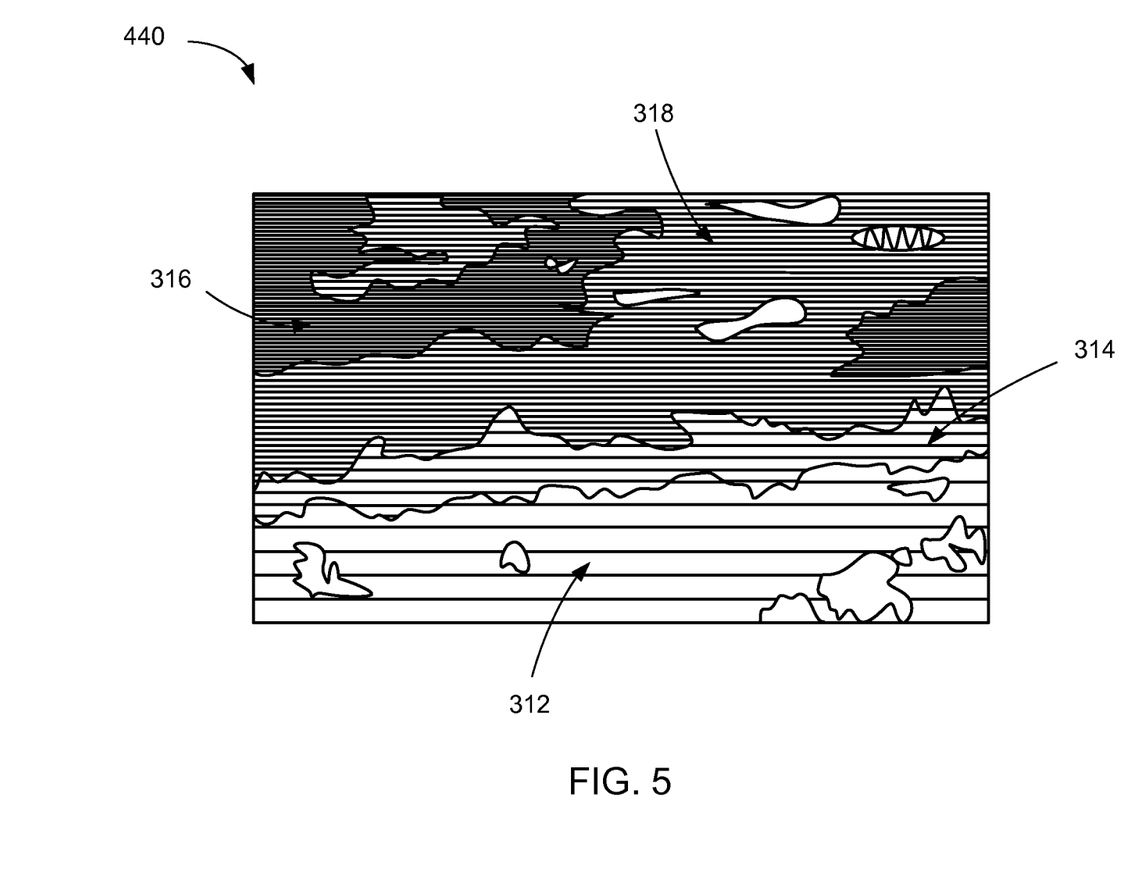
FIG. 5 is an example of the three-dimensional image.

Referring now to FIG. 5, therein is shown an example of the three-dimensional image 440. The three-dimensional image 440 is depicted with the features in the original image 302 of FIG. 3 including the landscape 312, the mountains 314, the sky 316, and the clouds 318.

The landscape 312, the mountains 314, the sky 316, and the clouds 318 are shown in the three-dimensional image 440 based on the landscape depth 320 of FIG. 3, the mountain depth 322 of FIG. 3, the sky depth 324 of FIG. 3, and the cloud depth 326 of FIG. 3, respectively. For illustration purposes, depths of the features are represented by a density of horizontal lines in the three-dimensional image 440 as an example.

The density of the horizontal lines is a number of the horizontal lines per a unit area in the three-dimensional image 440. For example, a feature having the lowest depth value can be considered farthest from the viewer, and thus, its depth can be represented by the highest density of the horizontal lines. Also for example, a feature having the highest depth value can be considered closest to the viewer, and thus, its depth can be represented by the lowest density of the horizontal lines.

As an example, an order of the depths can be in an increasing order of the sky depth 324, the cloud depth 326, the mountain depth 322, and the landscape depth 320. As a specific example, the sky 316 is shown having the highest density of the horizontal lines for being farthest from the viewer, and the landscape 312 is shown having the lowest density of the horizontal lines for being closest to the viewer.

Figure 6:
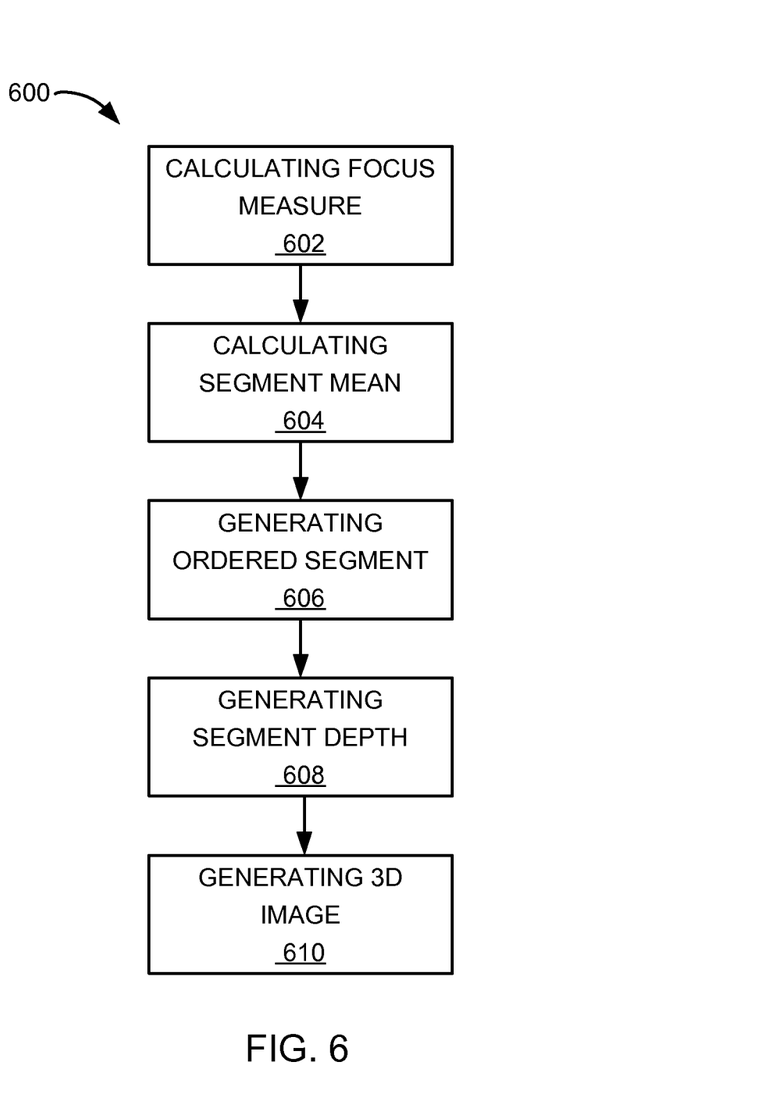
FIG. 6 is a flow chart of a method of operation of the display system in a further embodiment of the present invention.

Referring now to FIG. 6, therein is shown a flow chart of a method 600 of operation of the display system 100 in a further embodiment of the present invention. The method 600 includes: calculating a focus measure for an original image in a block 602; calculating a segment mean based on the focus measure for a segment in a block 604; generating an ordered segment based on the segment mean in a block 606; generating a segment depth based on the ordered segment in a block 608; and generating a three-dimensional image with the segment depth for displaying on a device in a block 610.

Thus, it has been discovered that the display system of the present invention furnishes important and heretofore unknown and unavailable solutions, capabilities, and functional aspects for a display system with image conversion mechanism. The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a display system comprising:
calculating a focus measure for an original image;
calculating a segment mean based on the focus measure for a segment of the original image;
generating an ordered segment, with a control unit, based on the segment mean;
generating a segment depth based on the ordered segment, given by:

$$D(x,y)|_{(x,y)\in R_k} = A/S_{max} S_k$$

wherein $D(x,y)$ is the segment depth, A is a gain, $S_{max}$ is a maximum value of the segment mean for the original image, and $S_k$ is the segment mean for the segment; and
generating a three-dimensional image with the segment depth for displaying on a device.

2. The method as claimed in claim 1 wherein generating the ordered segment includes generating the ordered segment by arranging the segment in a segment order.

3. The method as claimed in claim 1 further comprising calculating a focus degree sum based on the focus measure and the segment.

4. The method as claimed in claim 1 further comprising calculating a segment pixel sum based on the segment.

5. The method as claimed in claim 1 further comprising generating a filter response of the original image.

6. A method of operation of a display system comprising:
calculating a focus measure for an original image;
calculating a segment mean based on the focus measure for a segment of the original image;
generating an segment, with a control unit, based on the segment mean;
generating a segment depth based on the ordered segment, given by:

$$D(x,y)|_{(x,y)\in R_k} = A/S_{max} S_k$$

wherein $D(x,y)$ is the segment depth, A is a gain, $S_{max}$ is a maximum value of the segment mean for the original image, and $S_k$ is the segment mean for the segment; and
generating a three-dimensional image with the original image and the segment depth for displaying on a device.

7. The method as claimed in claim 6 wherein generating the ordered segment includes generating the ordered segment by arranging the segment in a segment order with the segment order predetermined.

8. The method as claimed in claim 6 further comprising calculating a focus degree sum by calculating a summation of a number of the focus measure in the segment.

9. The method as claimed in claim 6 further comprising calculating a segment pixel sum by calculating a summation of positions in the segment.

10. The method as claimed in claim 6 further comprising:
generating a filter response of the original image; and
wherein:
calculating the focus measure includes calculating a convolution of the original image and the filter response.

11. A display system comprising:
a user interface configured to receive an original image; and
a control unit, coupled to the user interface, configured to:
generate a focus measure for the original image;
generate a segment mean based on the focus measure for a segment of the original image;
generate an ordered segment based on the segment mean;
generate a segment depth based on the ordered segment, given by:

$$D(x,y)|_{(x,y)\in R_k} = A/S_{max} S_k$$

wherein $D(x,y)$ is the segment depth, A is a gain, $S_{max}$ is a maximum value of the segment mean for the original image, and $S_k$ is the segment mean for the segment; and
generate a three-dimensional image with the segment depth for displaying on a device.

12. The system as claimed in claim 11 wherein the control unit is configured to generate the ordered segment by arranging the segment in a segment order.

13. The system as claimed in claim 11 wherein the control unit is configured to calculate a focus degree sum based on the focus measure and the segment.

14. The system as claimed in claim 11 wherein the control unit is configured to calculate a segment pixel sum based on the segment.

15. The system as claimed in claim 11 wherein the control unit is configured to generate a filter response of the original image.

16. The system as claimed in claim 11 wherein the control unit is configured to generate the three-dimensional image with the original image and the segment depth for displaying on the device.

17. The system as claimed in claim 16 wherein the control unit is configured to generate the ordered segment by arranging the segment in a segment order with the segment order predetermined.

18. The system as claimed in claim 16 wherein the control unit is configured to calculate a focus degree sum by calculating a summation of a number of the focus measure in the segment.

19. The system as claimed in claim 16 wherein control unit is configured to calculate a segment pixel sum by calculating a summation of positions in the segment.

20. The system as claimed in claim 16 wherein the control unit is configured to:
   generate a filter response of the original image; and
   calculate a convolution of the original image and the filter response.

* * * * *